April 17, 1962   R. C. HILDEBRANDT   3,029,717
DEVICE FOR RECORDING DATA ON A FILM STRIP
Filed April 17, 1959
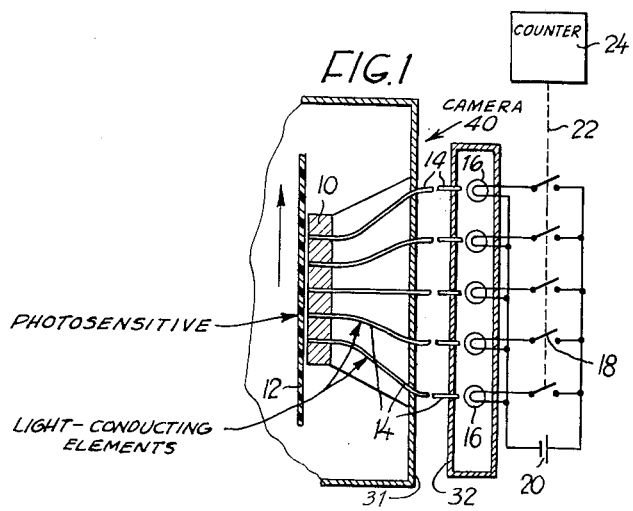
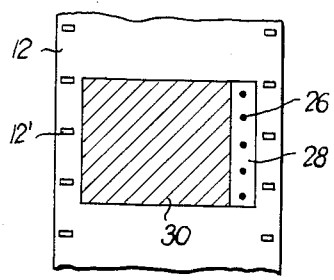
RUDOLF CARL HILDEBRANDT
*INVENTOR.*
BY
*Agent*

# United States Patent Office 3,029,717
Patented Apr. 17, 1962

3,029,717
DEVICE FOR RECORDING DATA ON A FILM STRIP
Rudolf Carl Hildebrandt, 37 Grev Turegatan, Stockholm, Sweden
Filed Apr. 17, 1959, Ser. No. 807,198
Claims priority, application Sweden Apr. 24, 1958
1 Claim. (Cl. 95—1.1)

The present invention relates to a device for recording data on a film strip in a photographic camera, coincidentally with taking a picture.

It has long been a problem to place data marks on a film or a plate in a camera together with a picture exposure, for example for documenting an event together with the actual time of is occurrence. For this purpose, pictures were sometimes taken together with the image of, for example, a clock placed in front of the camera. If this clock was combined with the camera in a special frame, this solution, however, required a very voluminous apparatus suitable only for stationary use but not for portable cameras.

It has also been known to use besides the objective for taking the picture, a special lens system for data marking adapted to project the dial of the clock or some equivalent time indicator onto the light-sensitive layer in the camera. This additional objective, however, requires a larger space and necessitates an initial dimensioning of the camera to accommodate for both the lens systems.

These drawbacks are eliminated in a device according to the invention essentially by providing a plurality of light channels without lenses, these channels extending from a light source individual to each light channel towards a marking area alongside the picture area on the film strip to be exposed.

The invention is illustrated in connection with the accompanying drawing. FIG. 1 is a schematical view of a recording device according to the invention; FIG. 2 is a view of a film strip with data marks placed next to the picture area.

The device shown in FIG. 1 comprises a light shield 10 placed in a camera 40 in front of or behind a film strip 12 in contact therewith. A number of light channels in form of light conducting elements 14, made of some light-transmitting material such as acrylic resin, terminate in the shield (D). The ends of the light conducting elements facing the film 12 can extend into close proximity with the film layer 12 or pass only partly through the light shield 10 in such a manner that a tubular hole will be in front of each light conducting element 14 to guide the light towards the film strip 12. The other, distal ends of the light conducting elements are arranged in front of light sources 16 individually provided for each light conducting element, the sources being represented for example by incandescent lamps 16. These lamps are connected with a current source 20 via switches 18, each lamp having one switch. The switches 18 in turn are coupled to a conventional code converter 24, such as a counter, by means of suitable coupling means schematically shown on the drawing by a dotted line 22. The code converter has the purpose of changing data to be recorded, and which are fed into the counter, into operating impulses for opening or closing the switches 18. These data can be measured values or the actual time of the picture exposure or other information which is to be recorded on the film strip 12 togther with the picture taken by means of the camera.

FIG. 2 shows the data record produced on the film strip 12 in the form of dots 26 with the aid of light shield 10, light channels 14 and light sources 16, the dots 26 being located on a marking area 28 alongside of a picture area 30. The film strip is provided with the usual perforations 12' for feeding the film.

The recording device shown in FIG. 1 is distinguished by the possibility of extremely compact dimensioning which is a prerequisite whenever the device has to be placed in existing narrow film cameras accommodating only a diaphragm body measuring about 1 to 2 millimeters in width and for example 7 millimeters in length. In such device the light channels 14 of flexible resinous conductors conveniently can be led out of the camera housing 31 to a separate box 32 containing the light sources 16.

What I claim is:

In a photographic camera having a housing and means within said housing for exposing a photosensitive film, in combination, film-guiding means including a light shield in said housing positioned adjacent the path of said film, said light shield being provided with a face positioned to make area contact with the film and further provided with a plurality of apertures opening onto said face, a plurality of solid light conductors of flexible material respectively terminating at said apertures within said light shield, said conductors having extremities extending to the exterior of said housing, and lighting means outside said housing selectively operable to illuminate said extremities in different combinations, and a receptacle separate from said housing means containing said lighting means.

References Cited in the file of this patent
UNITED STATES PATENTS

| | | |
|---|---|---|
| 2,024,627 | Crabtree | Dec. 17, 1935 |
| 2,286,014 | Rowe | June 9, 1942 |
| 2,507,909 | Kaysen | May 16, 1950 |
| 2,796,800 | Klemperer | June 25, 1957 |
| 2,821,124 | Enright | Jan. 28, 1958 |
| 2,827,826 | Dale | Mar. 25, 1958 |